UNITED STATES PATENT OFFICE.

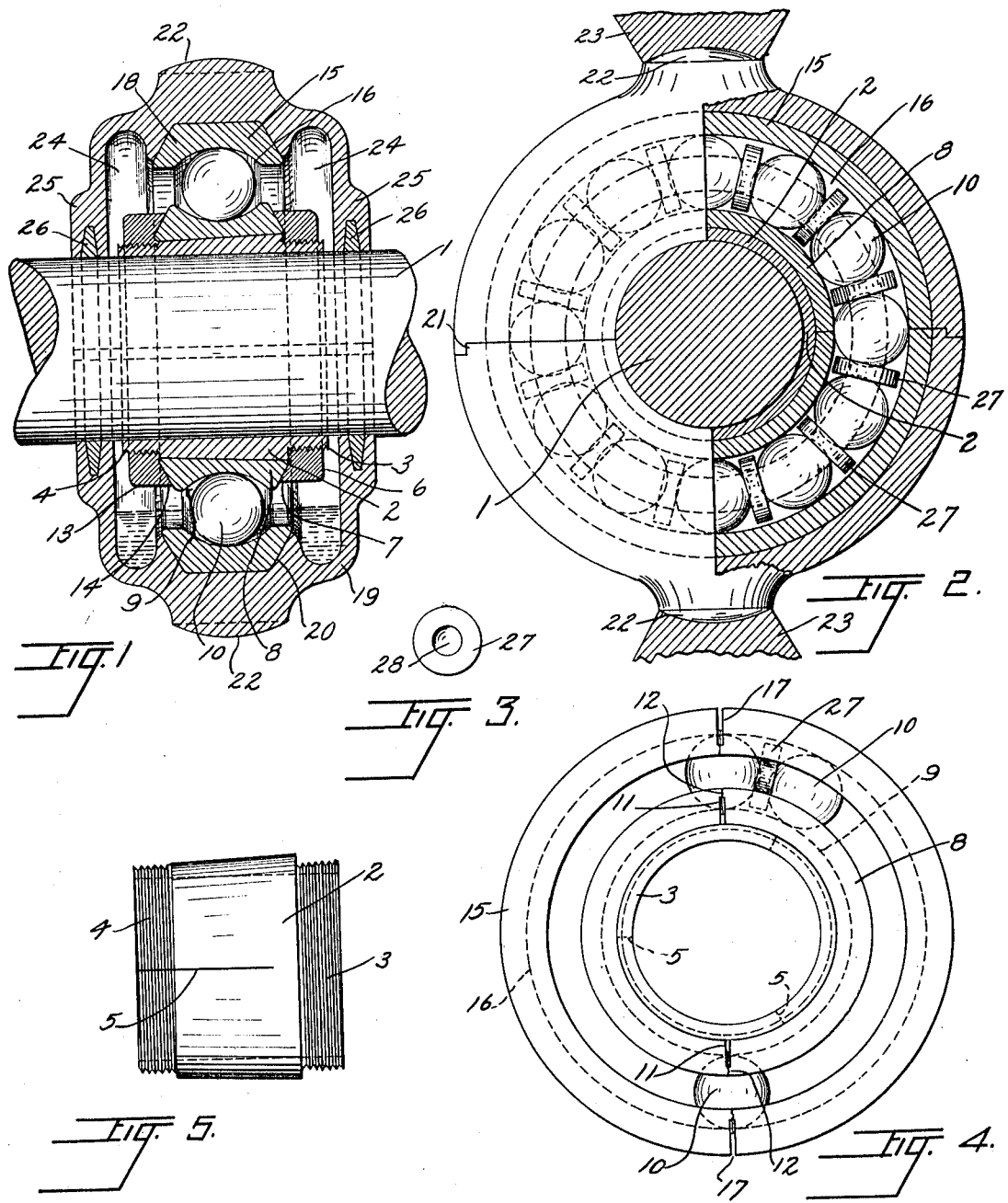

STEFAN SCHNEIDER, OF CHICAGO, ILLINOIS.

BALL-BEARING.

1,026,463.  Specification of Letters Patent.  Patented May 14, 1912.

Application filed October 27, 1911. Serial No. 657,157.

*To all whom it may concern:*

Be it known that I, STEFAN SCHNEIDER, a subject of the Emperor of Germany, and residing at Chicago, in the county of Cook and State of Illinois, have invented a new and useful Improvement in Ball-Bearings, of which the following is a complete specification.

The main objects of this invention are to provide an improved ball bearing particularly adaptable for use in suspending transmission shafts, though capable of use for many other purposes; to provide a bearing which is capable of being removed from the shaft for inspection or repair without dismounting the shaft; to provide a ball bearing in which the friction of the balls is reduced to a minimum; to provide a ball bearing in which the balls are separated by movable or floating spacers; to provide a ball bearing in which the ball races are separable to adapt them to be easily mounted in place; and to provide a strong, cheap and simple bearing adapted to be easily and quickly mounted in place.

A specific embodiment of the invention is illustrated in the accompanying drawing, in which:

Figure 1 is a central longitudinal section of the bearing mounted on a transmission shaft. Fig. 2 is a view of the bearing partly in end elevation and partly in transverse section and showing the means for mounting the bearing. Fig. 3 is a side elevation of one of the spacers. Fig. 4 is an end elevation of the ball races and the clamping sleeve. Fig. 5 is a side elevation of the clamping sleeve.

In the construction shown the transmission shaft 1, or other member upon which the bearing is used, has mounted thereon a clamping sleeve 2 which is provided with externally threaded ends 3 and 4, between which the external surface of the sleeve tapers from the end 3 toward the end 4. The sleeve 2 is provided with longitudinal slits 5 which extend from the end 4 to near the large end of the tapered portion, as shown more clearly in Fig. 5.

Having threaded engagement on the threaded end 3 of said sleeve is a ring 6 having on its inner face, or that adjacent to the tapered portion of the sleeve 2, an over-hanging outwardly beveled lip 7. Mounted on the tapered portion of the sleeve 2 is the inner race ring 8 which has a groove 9 in its periphery adapted to receive the balls 10. Said race ring has beveled sides which slope from the periphery outwardly and the side adjacent to the ring 6 fits into or under the lip 7. The race ring 8 is sawed or cut in from its inner side to near its periphery with a pair of oppositely disposed slits 11 and is then broken as at 12 for the remaining distance to the periphery. In this manner the parts of the race ring may be accurately fitted together on the sleeve 2. A ring 13 having a beveled lip 14 on its face adjacent the race ring 8, has threaded engagement on the end 4 of the sleeve 2, and when screwed up against the race 8 acts to clamp the sleeve 2 firmly on the shaft 1 and clamp the race ring 8 firmly on the sleeve 2.

The outer race ring 15 has a groove 16 in its inner side to receive the balls 10 and is also formed in two parts or sections by means of slits 17 in the same manner as described with reference to the race ring 8. The sides 18 of the race ring 15 are also beveled from its periphery outwardly and an annular casing 19 has a groove 20 on its inner side with flaring sides adapted to receive the race ring 15 therein.

The casing 19 is formed in two sections which are separable longitudinally of the shaft and are united by an interfitting lap joint 21. Each section is provided on its periphery with a ball member 22 of a ball and socket joint, and the socket member 23 therefor is formed in any suitable hanger for the bearing. The casing is provided in its inner surface, on each side of the ball race 15, with a groove or channel 24, adapted in the lower portion of the casing to contain lubricant, and in the bearing portions 25 of the casing are inserted bearing rings 26.

The balls 10 are free to rotate in the raceways of the rings 8 and 15, and between each two adjacent balls is inserted a spacer 27, which is disk shaped and is provided with a countersunk seat 28 in each side thereof. The spacers are of less diameter than the balls, and inasmuch as the balls fit in the seats 28, the spacers are held out of contact with the races, so that there are no friction spacers and races.

The operation of the construction shown is as follows: When assembling the bearing on the shaft, the clamping sleeve 2 is first placed on the shaft with the ring 6 thereon. The parts of the race ring 8 are then fitted together on the sleeve and the ring 13 is secured on the end 4, thereby clamping the sleeve on the shaft and clamping the race ring 8 to the sleeve. The balls and spacers are then placed in the lower half of the race ring 15 which is carried in the lower half of the casing, and the lower half of the race ring 15 and casing are put in place. The other balls and spacers are then put in place in the upper portion of the race ring 8, and the upper half of the race ring 15 and casing are placed therein, and the hanger is properly set to hold the socket 23 and ball 22 in proper relation to each other. Said ball and socket members permit the bearing to adjust itself to the shaft alinement. When the shaft rotates the race ring 8 rotates therewith and causes the balls and spacers to travel in the race ring 15. The overlapping joint 21 between the sections of the casing hold the section in proper position.

While but one specific embodiment of the invention has been herein shown and described it will be understood that many details of the construction shown may be varied or omitted without departing from the scope of the claims.

I claim:

1. In a ball bearing, an outer and inner race ring, each race ring being cut partially through from its back at a plurality of points and broken the remainder of the way, a casing holding the sections of the outer race ring together, and clamping rings on each side of the inner race ring and adapted to hold the sections thereof together.

2. A ball bearing comprising a split sleeve, clamping rings having threaded engagement on the ends of the sleeve and each having an inwardly inclined lip on its inner face, a sectional race ring on the sleeve between said rings having sides inclined complementally with said lips, a sectional casing, a sectional race ring in the casing, and balls in the raceways of said rings.

In testimony whereof I have hereunto subscribed my name in the presence of two witnesses.

STEFAN SCHNEIDER.

Witnesses:
JOSEPH SCHLENKER,
ROBT. KLOTZ.